United States Patent
Otani et al.

(10) Patent No.: US 11,732,440 B2
(45) Date of Patent: Aug. 22, 2023

(54) REMOTE OPERATION SYSTEM AND REMOTE OPERATION SERVER

(71) Applicant: KOBELCO CONSTRUCTION MACHINERY CO., LTD., Hiroshima (JP)

(72) Inventors: Masaki Otani, Hiroshima (JP); Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 168 days.

(21) Appl. No.: 17/438,145

(22) PCT Filed: Dec. 2, 2019

(86) PCT No.: PCT/JP2019/047061
§ 371 (c)(1),
(2) Date: Sep. 10, 2021

(87) PCT Pub. No.: WO2020/194882
PCT Pub. Date: Oct. 1, 2020

(65) Prior Publication Data
US 2022/0186465 A1 Jun. 16, 2022

(30) Foreign Application Priority Data
Mar. 26, 2019 (JP) .................................. 2019-058104

(51) Int. Cl.
*E02F 9/20* (2006.01)
*G06V 40/18* (2022.01)
(Continued)

(52) U.S. Cl.
CPC .............. *E02F 9/205* (2013.01); *E02F 9/261* (2013.01); *G05D 1/0038* (2013.01); *G06V 40/18* (2022.01);
(Continued)

(58) Field of Classification Search
None
See application file for complete search history.

(56) References Cited

U.S. PATENT DOCUMENTS 4,884,939 A * 12/1989 Nielsen ................... E02F 3/435
901/47
6,342,915 B1 1/2002 Ozaki et al.
(Continued)

FOREIGN PATENT DOCUMENTS

DE 102016011354 A1 * 3/2018 ......... B60H 1/00357
EP 3363684 A1 * 8/2018 ............. B60Q 1/085
(Continued)

OTHER PUBLICATIONS

The extended European search report dated Mar. 10, 2022 issued in the corresponding EP Patent Application No. 19921340.6.

*Primary Examiner* — Stefan Gadomski
(74) *Attorney, Agent, or Firm* — Carrier, Shende & Associates P.C.; Joseph P. Carrier; Fulchand P. Shende

(57) ABSTRACT

Provided is a system which can supply appropriate information to one operator from a viewpoint that the one operator grasps a remotely operated action of a working machine by another operator. In a first remote operation apparatus 10, a sight line detector 112 detects a sight line of a first operator, and transmits sight line detection data corresponding to the sight line of the first operator. In a second remote operation apparatus 20, a second image output device 221 displays a designated image region spreading with reference to the sight line of the first operator corresponding to the sight line detection data in an environ- (Continued)

mental image corresponding to captured image data acquired by an imaging device 401 of a working machine 40, in a form different from a form of an image region around the designated image region.

2 Claims, 10 Drawing Sheets

(51) Int. Cl.
*E02F 9/26* (2006.01)
*G05D 1/00* (2006.01)
*H04N 7/18* (2006.01)

(52) U.S. Cl.
CPC ..... *H04N 7/183* (2013.01); *G05D 2201/0202* (2013.01)

(56) References Cited

U.S. PATENT DOCUMENTS

| | | | |
|---|---|---|---|
| 11,028,560 B2* | 6/2021 | Taylor | E02F 3/54 |
| 2014/0170617 A1* | 6/2014 | Johnson | G09B 19/167 |
| | | | 434/219 |
| 2016/0004305 A1* | 1/2016 | Pagliani | G06F 3/011 |
| | | | 345/633 |
| 2018/0122333 A1 | 5/2018 | Horiike | |
| 2018/0144523 A1* | 5/2018 | Edelman | B60K 35/00 |
| 2018/0172990 A1* | 6/2018 | Fujita | G02B 27/01 |
| 2018/0236928 A1* | 8/2018 | Fritz | B60Q 1/24 |
| 2019/0032304 A1* | 1/2019 | Bolz | B60K 35/00 |
| 2019/0352885 A1* | 11/2019 | Kurokami | B60R 1/00 |
| 2020/0071912 A1* | 3/2020 | Kennedy | G06V 20/17 |
| 2020/0150650 A1* | 5/2020 | Jarlengrip | E02F 9/226 |
| 2020/0277757 A1* | 9/2020 | Kurokami | E02F 9/24 |
| 2021/0140147 A1* | 5/2021 | Filla | E02F 9/261 |

FOREIGN PATENT DOCUMENTS

| | | |
|---|---|---|
| JP | 2008-144378 A | 6/2008 |
| JP | 2016-076801 A | 5/2016 |
| WO | 2010/137165 A1 | 12/2010 |
| WO | 2017/042873 A1 | 3/2017 |

* cited by examiner

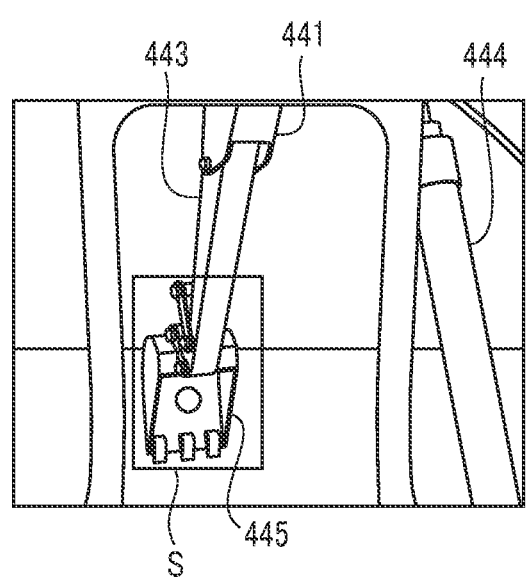

REMOTE OPERATION SYSTEM AND REMOTE OPERATION SERVER

TECHNICAL FIELD

The present invention relates to a system for performing a remote operation of a working machine or the like.

BACKGROUND ART

A technology of remotely operating a working machine is suggested (see, e.g., Patent Literature 1).

CITATION LIST

Patent Literature

Patent Literature 1: Japanese Patent Laid-Open No. 2016-076801

SUMMARY OF INVENTION

Technical Problem

It is preferable to allow one operator who is less skilled in a remote operation of a working machine to grasp a remotely operated action for a working machine by the other skilled operator from a viewpoint of improving the skill.

To solve the problem, an object of the present invention is to provide a system which can provide appropriate information to one operator from a viewpoint of allowing the one operator to grasp a remotely operated action for a working machine by the other operator.

Solution to Problem

The present invention relates to a remote operation system comprising: a working machine including an actuation mechanism and an imaging device which images environment including at least a part of the actuation mechanism; and a first remote operation apparatus and a second remote operation apparatus each including wireless communication equipment, an image output device which displays an environmental image corresponding to captured image data acquired by the imaging device of the working machine and an operation mechanism configured to perform a remote operation of the working machine.

In the remote operation system of the present invention, the first remote operation apparatus comprises a sight line detector which detects a sight line of an operator, and a first client control device which transmits, to the wireless communication equipment, sight line detection data corresponding to the sight line of the operator which is detected by the sight line detector, and the second remote operation apparatus comprises a second client control device which displays, in the image output device, a designated image region as an image region spreading with reference to the sight line of the operator corresponding to the sight line detection data received by the wireless communication equipment in the environmental image, in a form different from a form of an image region around the designated image region.

The present invention relates to a remote operation server having an intercommunicating function with a working machine including an actuation mechanism and an imaging device which images environment including at least a part of the actuation mechanism, and with each of a first remote operation apparatus and a second remote operation apparatus each including an image output device which displays an environmental image corresponding to captured image data acquired by the imaging device of the working machine by use of a wireless communicating function and an operation mechanism configured to perform a remote operation of the working machine.

The remote operation server of the present invention comprises: a first server arithmetic processing element which receives, from the first remote operation apparatus, sight line detection data corresponding to a sight line of an operator which is detected in the first remote operation apparatus; and a second server arithmetic processing element which transmits the sight line detection data to the second remote operation apparatus, and displays, in the image output device of the second remote operation apparatus, a designated image region as an image region spreading with reference to the sight line of the operator corresponding to the sight line detection data in the environmental image, in a form different from a form of an image region around the designated image region.

BRIEF DESCRIPTION OF DRAWINGS

FIG. 6A is an explanatory view concerning a first aspect of image output in a second image output device.

DESCRIPTION OF EMBODIMENTS (Configuration)

Figure 1:
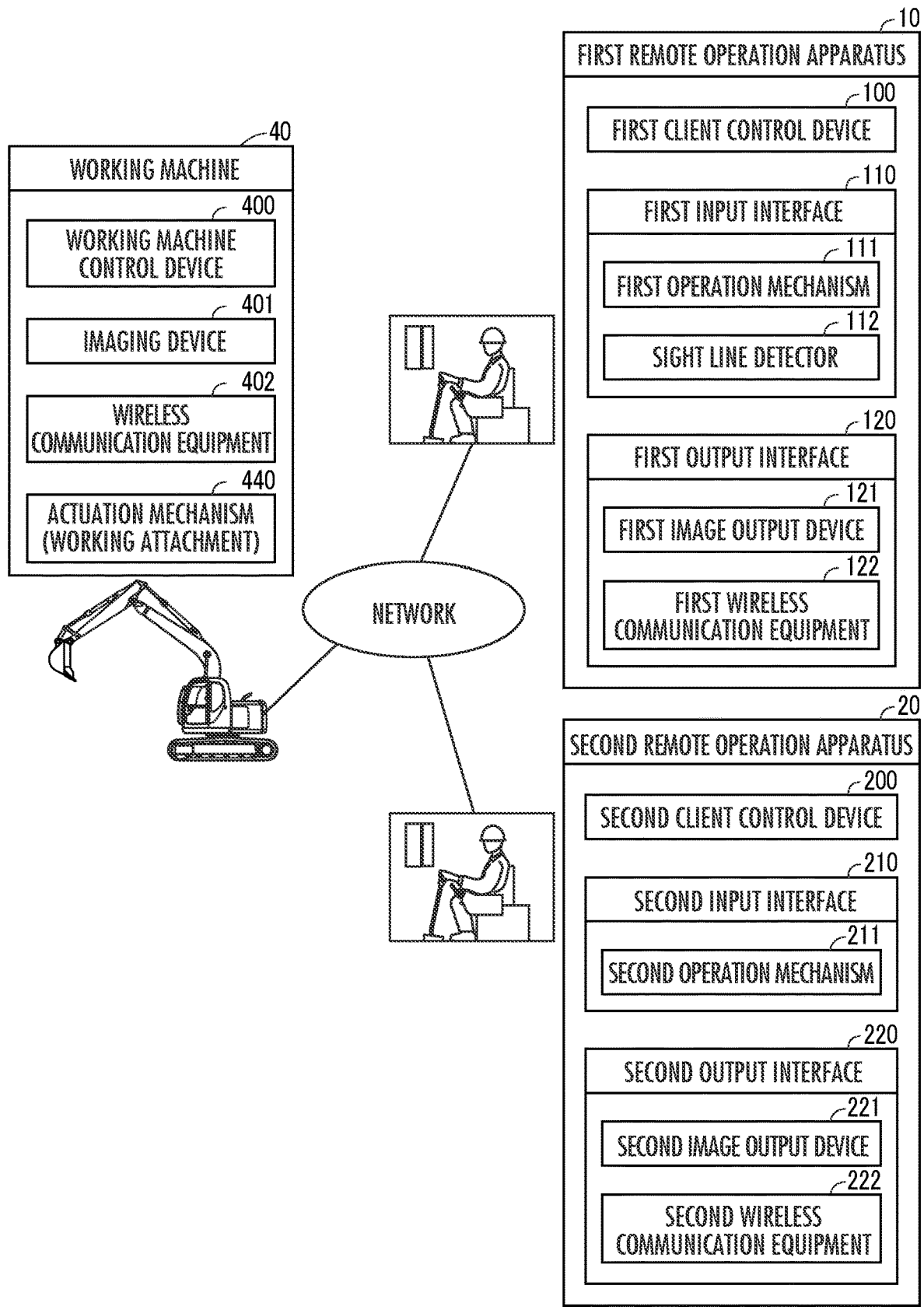
FIG. 1 is an explanatory view concerning a configuration of a remote operation system as an embodiment of the present invention.

A remote operation system as an embodiment of the present invention shown in FIG. 1 comprises a first remote operation apparatus 10, a second remote operation apparatus 20, and a working machine 40. A remote operation main body of the common working machine 40 is switchable between first remote operation apparatus 10 and the second remote operation apparatus 20.

(Configuration of Working Machine)

The working machine 40 comprises a working machine control device 400, an imaging device 401, wireless communication equipment 402 and an actuation mechanism 440. The working machine control device 400 is constituted of an arithmetic processing device (a single core processor or a multicore processor or a processor core forming this processor), and reads required data and software from a storage device such as a memory, to execute arithmetic processing of the data as an object in accordance with the software.

Figure 2:
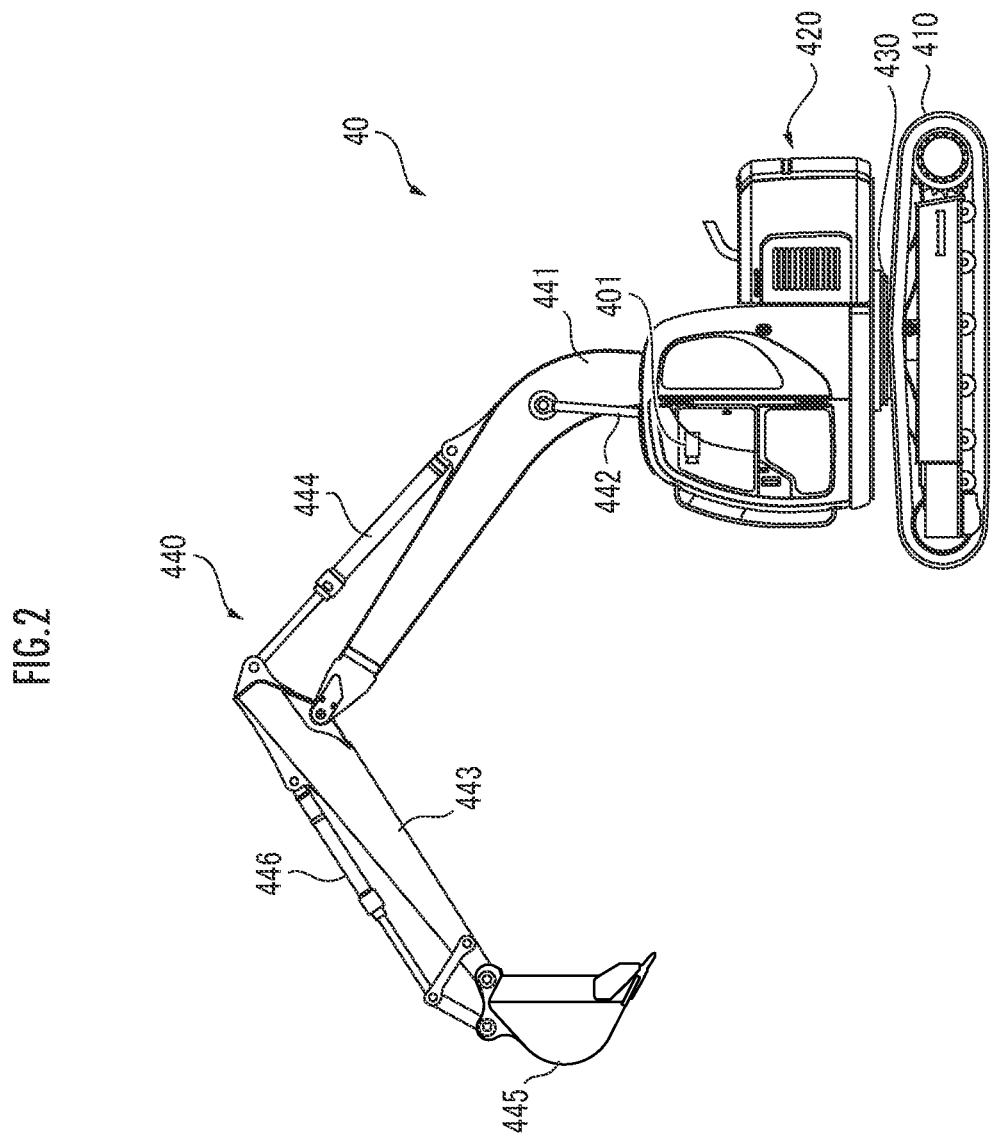
FIG. 2 is an explanatory view concerning a configuration of a working machine.

The working machine 40 is, for example, a crawler excavator (a construction machine), and comprises a crawler type of lower running body 410, and an upper rotation body 420 rotatably mounted on the lower running body 410 via a rotation mechanism 430 as shown in FIG. 2. A cab (driver's cab) 422 is disposed in a front left part of the upper rotation body 420. The working attachment 440 is disposed in a front central part of the upper rotation body 420.

The working attachment 440 as the actuation mechanism comprises a boom 441 capable of rising when mounted to the upper rotation body 420, an arm 443 rotatably coupled to a tip end of the boom 441, and a bucket 445 rotatably coupled to a tip end of the arm 443. A boom cylinder 442 constituted of a telescopic hydraulic cylinder, an arm cylinder 444 and a bucket cylinder 446 are mounted to the working attachment 440.

The boom cylinder 442 is interposed between the boom 441 and the upper rotation body 420 to receive supply of hydraulic oil, thereby expand and contract and rotate the boom 441 in a rising direction. The arm cylinder 444 is interposed between the arm 443 and the boom 441 to receive supply of hydraulic oil, thereby expand and contract and rotate the arm 443 relative to the boom 441 about a horizontal axis. The bucket cylinder 446 is interposed between the bucket 445 and the arm 443 to receive supply of hydraulic oil, thereby expand and contract and rotate the bucket 445 relative to the arm 443 about the horizontal axis.

The imaging device 401 is installed, for example, in the cab 422, and environment including at least a part of the actuation mechanism 440 is imaged through a front window of the cab 422.

The cab 422 is provided with an actual machine-side operation lever corresponding to an operation lever (described later) forming the first remote operation apparatus 10, and a drive mechanism or a robot which receives, from a remote operation room, a signal in response to an operational action of each operation lever, and moves the actual machine operation lever based on the received signal.

(Configuration of First Remote Operation Apparatus)

The first remote operation apparatus 10 comprises a first client control device 100, a first input interface 110, and a first output interface 120. The first client control device 100 is constituted of an arithmetic processing device (a single core processor or a multicore processor or a processor core forming this processor), and reads required data and software from a storage device such as a memory, to execute arithmetic processing of the data as an object in accordance with the software. The first input interface 110 comprises a first operation mechanism 111 and a sight line detector 112. The first output interface 120 comprises a first image output device 121 and first wireless communication equipment 122.

The first operation mechanism 111 includes a running operation device, a rotating operation device, a boom operation device, an arm operation device, and a bucket operation device. Each operation device includes an operation lever which receives a rotating operation. The operation lever (a running lever) of the running operation device is operated to move the lower running body 410. The running lever may serve also as a running pedal. For example, the running pedal fixed to a base or a lower end of the running lever may be disposed. An operation lever (a rotation lever) of the rotating operation device is operated to move a hydraulic rotation motor forming the rotation mechanism 430. An operation lever (a boom lever) of the boom operation device is operated to move the boom cylinder 442. An operation lever (an arm lever) of the arm operation device is operated to move the arm cylinder 444. An operation lever (a bucket lever) of the bucket operation device is operated to move the bucket cylinder 446.

Figure 3:
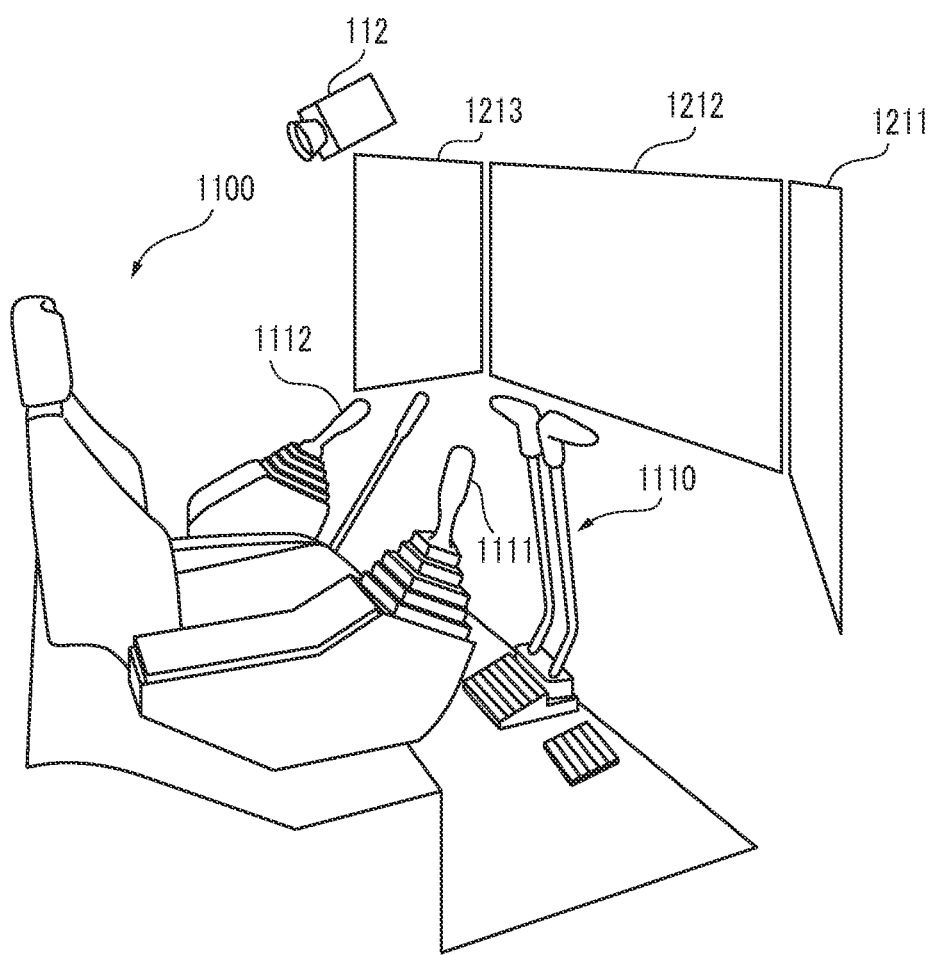
FIG. 3 is an explanatory view concerning a configuration of a first remote operation apparatus.

The respective operation levers forming the first operation mechanism 111 are arranged around a seat 1100 in which an operator is seated, for example, as shown in FIG. 3. The seat 1100 has, for example, a form of a high back chair with an arm rest, and may have an arbitrary form in which the operator can be seated, such as a form of a low back chair with no head rest, or a form of a chair with no backrest.

A pair of right and left running levers 1110 corresponding to right and left crawlers are laterally arranged side by side in front of the seat 1100. One operation lever may serve as a plurality of operation levers. For example, a right operation lever 1111 disposed in front of a right frame of the seat 1100 shown in FIG. 3 may function as the boom lever when operated in a front-rear direction and function as the bucket lever when operated in a right-left direction. Similarly, a left operation lever 1112 disposed in front of a left frame of the seat 1100 shown in FIG. 3 may function as the arm lever when operated in the front-rear direction, and function as the rotation lever when operated in the right-left direction. A lever pattern may be arbitrarily changed in response to an operator's operation instruction.

For example, as shown in FIG. 3, the first image output device 121 is constituted of a right diagonally forward image output unit 1211, a front image output unit 1212 and a left diagonally forward image output unit 1213 arranged diagonally forward right, in front and diagonally forward left relative to the seat 1100. The image output units 1211 to 1213 may further comprise a speaker (a voice output unit).

The sight line detector 112 detects a sight line of the operator based on a position of a moving point (a moving part) relative to a reference point (a part that does not move) of each eye of the operator seated in the seat 1100. In a case of determining a position of "an inner corner of the eye" as the reference point and determining a position of "iris" as the moving point, the sight line detector 112 is constituted of one or more visible light cameras. In a case of determining a position of "corneal reflex" as the reference point and determining a position of "pupil" as the moving point, the sight line detector 112 is constituted of one or more sets of an infrared LED and an infrared camera. Movement of an operator's head may be detected in addition to movement of the operator's eye, and a position and posture of the sight line detector 112 may be changed to a position and posture optimal for catching the sight line of the operator. In this case, one sight line detector 112 optimal for catching the sight line of the operator in a plurality of sight line detectors 112 may be switched.

In a captured image acquired by the sight line detector 112, a pixel region corresponding to each of a reference point and moving point of each eye of a first operator is determined. A real space position corresponding to the pixel region is determined, and thereby, a vector (a start point position and an end point position) representing the sight line of the operator in a real space is determined. A distance measurement sensor may be additionally for use in determining the real space position of the eye. In a plane representing a display image coordinate system of each of the image output units 1211 to 1213 in the real space, an intersection with the vector is determined as a center of a region of interest in a display image at which the operator looks.

(Configuration of Second Remote Operation Apparatus)

The second remote operation apparatus 20 comprises a second client control device 200, a second input interface 210, and a second output interface 220. The second client control device 200 is constituted of an arithmetic processing device (a single core processor or a multicore processor or a processor core forming this processor), and reads required data and software from a storage device such as a memory, to execute arithmetic processing of the data as an object in accordance with the software. The second input interface 210 comprises a second operation mechanism 211. The second output interface 220 comprises a second image output device 221 and second wireless communication equipment 222.

A detailed configuration of the second remote operation apparatus 20 is substantially similar to the configuration of the first remote operation apparatus 10 except that the sight line detector 112 is omitted and except a function of the second client control device 200 which will be described later, and hence, description is omitted (see FIG. 3).

(Function)

Figure 4:
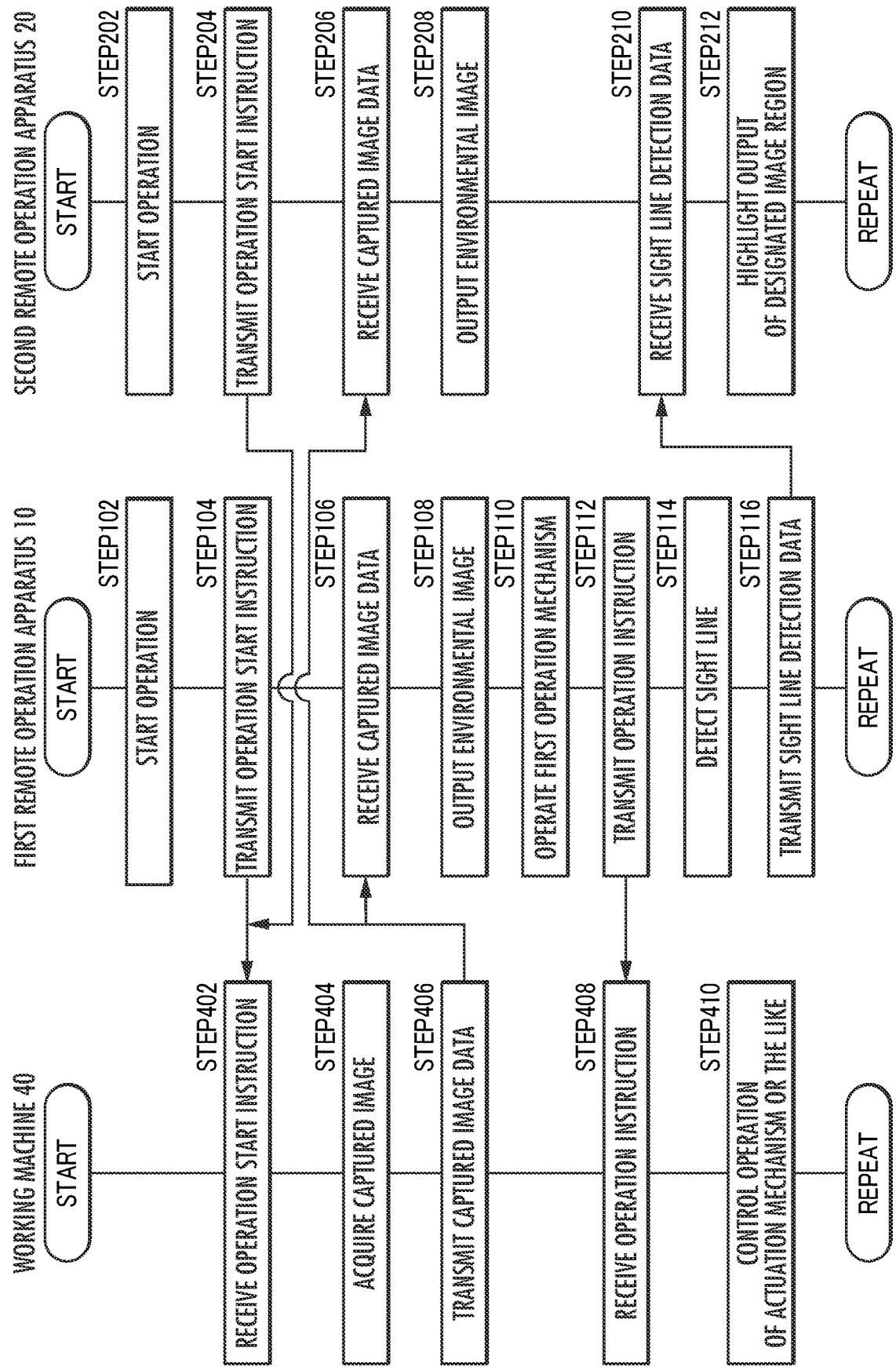
FIG. 4 is an explanatory view concerning a function of the remote operation system as the embodiment of the present invention.

In the first remote operation apparatus 10, a first operator performs a predetermined operation (FIG. 4/STEP102). The predetermined operation is, for example, an operation of a button or an operation lever forming the first input interface 110 or the first operation mechanism 111. In response to this operation, the first client control device 100 transmits an operation start instruction from the first remote operation apparatus 10 to the working machine 40 through the first wireless communication equipment 122 (FIG. 4/STEP104).

Similarly, in the second remote operation apparatus 20, a second operator performs a predetermined operation (FIG. 4/STEP202). The predetermined operation is, for example, an operation of a button or an operation lever forming the second input interface 210 or the second operation mechanism 211. In response to this operation, the second client control device 200 transmits an operation start instruction from the second remote operation apparatus 20 to the working machine 40 through the second wireless communication equipment 222 (FIG. 4/STEP204).

In the working machine 40, the working machine control device 400 receives the operation start instruction through the wireless communication equipment 402 (FIG. 4/STEP402). In response to this operation, the working machine control device 400 outputs an instruction to the imaging device 401, and in response to the instruction, the imaging device 401 acquires captured image (FIG. 4/STEP404). The working machine control device 400 transmits the captured image data representing the captured image to the first remote operation apparatus 10 and the second remote operation apparatus 20 through the wireless communication equipment 402 (FIG. 4/STEP406).

Figure 5:
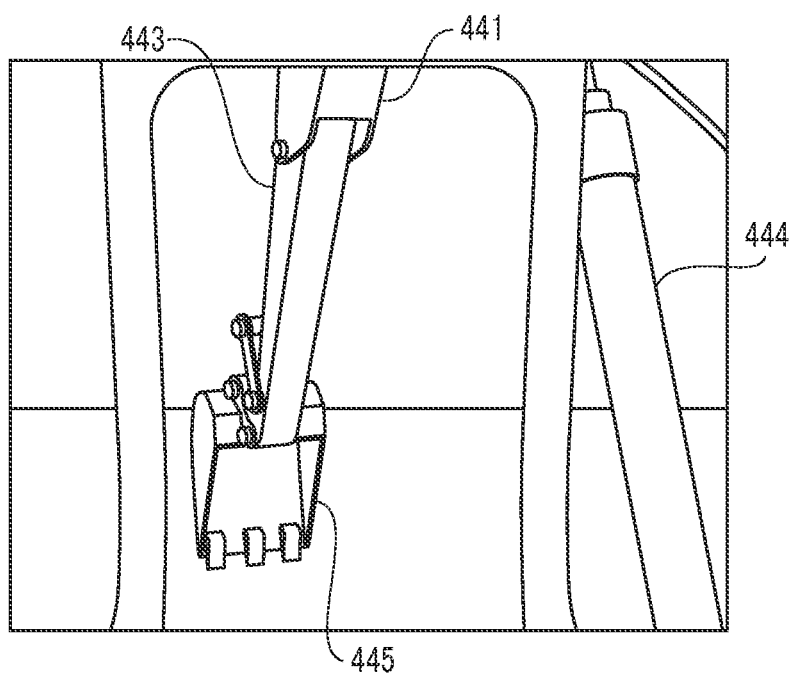
FIG. 5 is an explanatory view concerning an appearance of image output in a first image output device.

In the first remote operation apparatus 10, the first client control device 100 receives the captured image data through the first wireless communication equipment 222 (FIG. 4/STEP106). The first client control device 100 displays an environmental image corresponding to the captured image data (all or part of the captured image itself or a simulated environmental image generated based on this image) in the first image output device 121 (FIG. 4/STEP108). Similarly, in the second remote operation apparatus 20, the second client control device 200 receives the captured image data through the second wireless communication equipment 222 (FIG. 4/STEP206). The second client control device 200 displays the environmental image corresponding to the captured image data in the second image output device 221 (FIG. 4/STEP208). Consequently, for example, as shown in FIG. 5, the environmental image including the boom 441, the arm 443, the bucket 445 and the arm cylinder 444 that are parts of the working attachment 440 as the actuation mechanism is displayed in each of the first image output device 121 and the second image output device 221.

In the first remote operation apparatus 10, the first operator operates the first operation mechanism 111 (FIG. 4/STEP110), and in response to this operation, the first client control device 100 transmits an operation instruction corresponding to the operational action to the working machine 40 through the first wireless communication equipment 122 (FIG. 4/STEP112).

In the working machine 40, the working machine control device 400 receives an operation instruction through the wireless communication equipment 402 (FIG. 4/STEP408). In response to this instruction, the working machine control device 400 controls the operation of the working attachment 440 or the like (FIG. 4/STEP410). For example, an operation of scooping soil in front of the working machine 40 with the bucket 445 and rotating the upper rotation body 420 to drop the soil from the bucket 445 is executed.

In the first remote operation apparatus 10, the sight line detector 112 detects the sight line of the first operator (FIG. 4/STEP114). Consequently, a region of interest of the first operator in the environmental image displayed in the first image output device 121 is specified. The first client control device 100 transmits sight line detection data corresponding to sight line detection result to the second remote operation apparatus 20 through the first wireless communication equipment 122 (FIG. 4/STEP116).

In the second remote operation apparatus 20, the second client control device 200 receives the sight line detection data through the second wireless communication equipment 222 (FIG. 4/STEP210). The second client control device 200 displays, in the second image output device 221, an image region specified by the sight line detection data and highlighted more than another image region (FIG. 4/STEP212). For example, in a case where the sight line of the first operator, eventually the region of interest of the environmental image falls in an image region corresponding to the bucket 445, the image region is highlighted as "a designated image region" more prominently than the image region around the designated image region.

Figure 6B:
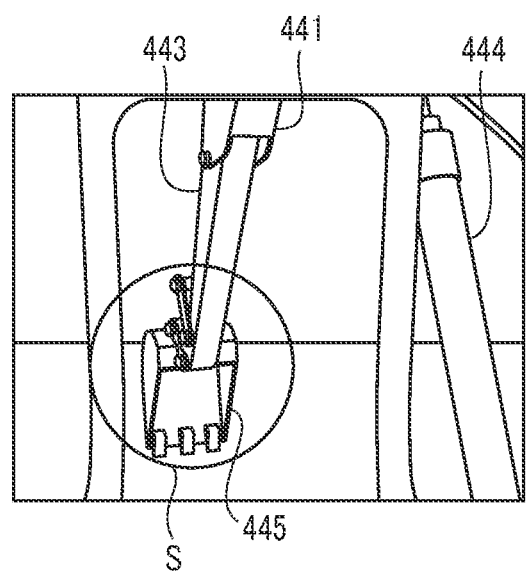
FIG. 6B is an explanatory view concerning a second aspect of the image output in the second image output device.
Figure 6C:
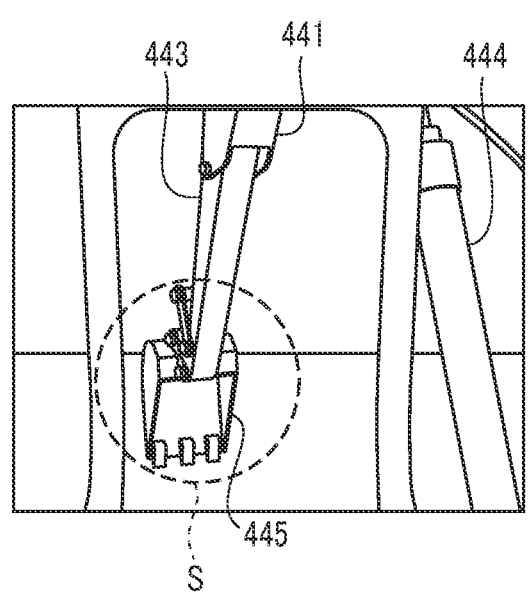
FIG. 6C is an explanatory view concerning a third aspect of the image output in the second image output device.
Figure 6D:
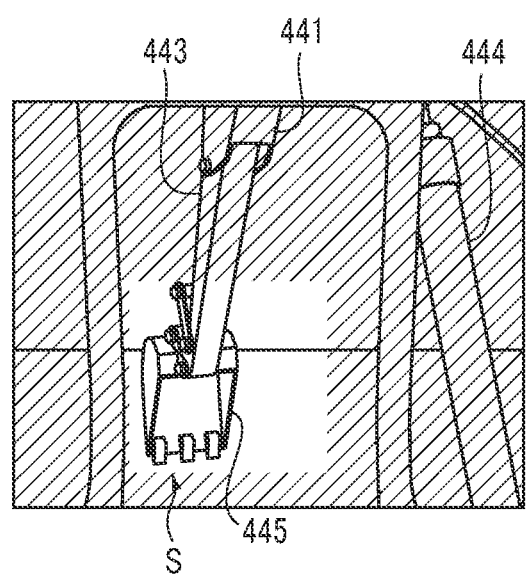
FIG. 6D is an explanatory view concerning a fourth aspect of the image output in the second image output device.

As shown in FIG. 6A, a figure such as a pointer may be superimposed and displayed on a designated image region S including an image region corresponding to the bucket 445. As shown in FIG. 6B, a figure such as a circle figure surrounding the designated image region S corresponding to the bucket 445 may be displayed. As shown in FIG. 6C, image quality of a rectangular designated image region S including the image region corresponding to the bucket 445 may be set to be higher than image quality of the other image region. Consequently, the designated image region S is displayed in a color image while the other image region may be displayed in a gray scale image. Alternatively, the designated image region S may be displayed in an image with a resolution higher than a resolution of the other image region. As shown in FIG. 6D, brightness of the rectangular designated image region S including the image region corresponding to the bucket 445 may be set to be higher than brightness of the other image region.

(Effects)

According to the remote operation system of the configuration, from a viewpoint that the second operator who operates the working machine 40 through the second remote operation apparatus 20 grasps an object of interest of the first operator as the remotely operated action for the working machine 40 by the first operator who operates the working machine 40 through the first remote operation apparatus 10, the designated image region displayed in a more highlighted manner than the image region around the designated image region in the environmental image displayed in the second image output device 221 can be supplied as appropriate information to the second operator (see FIG. 4/STEP212 and FIG. 6A to FIG. 6D). The second operator can recognize how to move the operation lever or the operational action by the first operator through visual recognition of the highlighted designated image region in the environmental image displayed in the second image output device 221.

(Another Embodiment of Present Invention)

Figure 7:
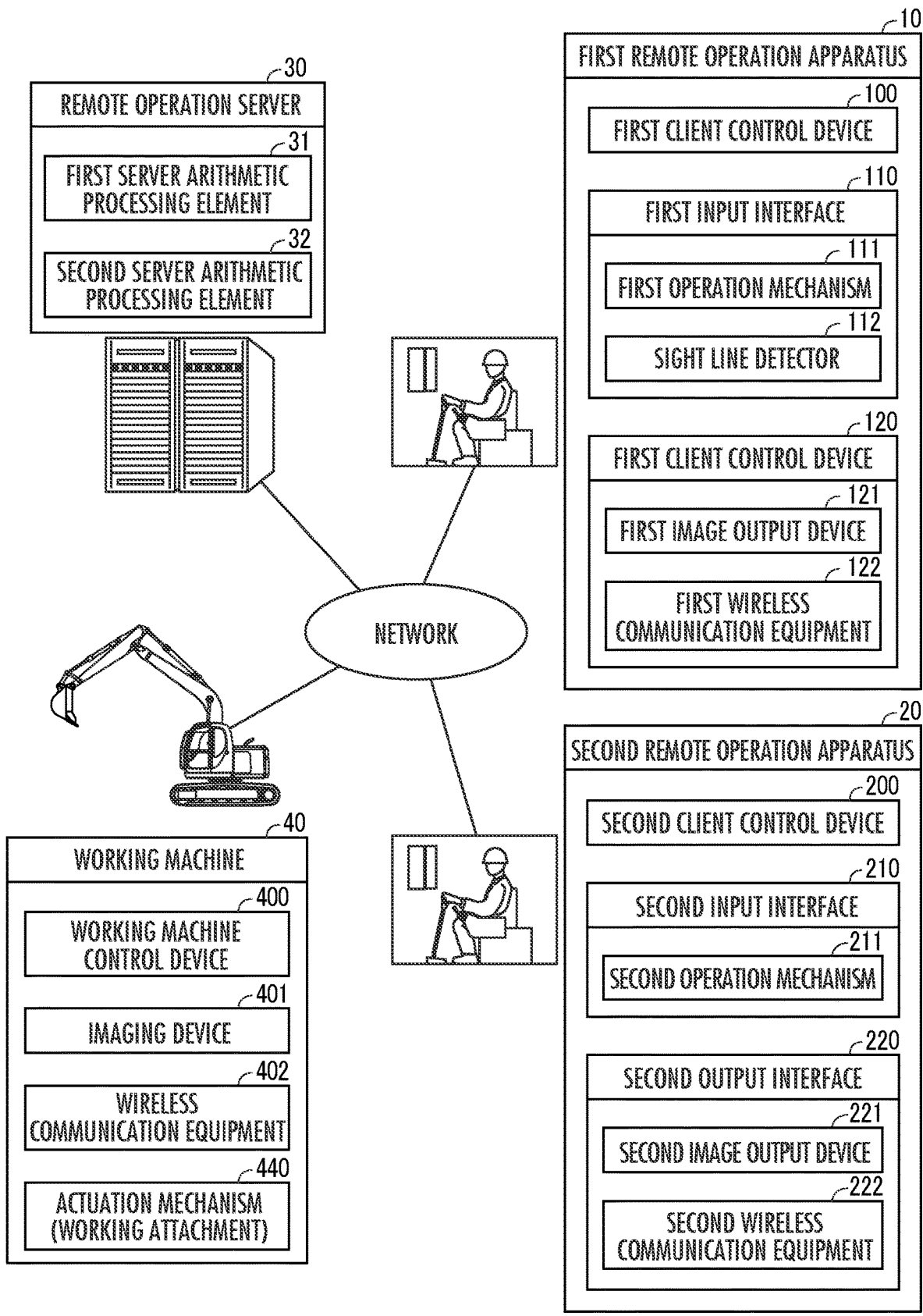
FIG. 7 is an explanatory view concerning a remote operation system as another embodiment of the present invention.

In the above embodiment, the first remote operation apparatus 10, the second remote operation apparatus 20 and the working machine 40 directly intercommunicate in accordance with a wireless communication system, and as another embodiment, the first remote operation apparatus 10, the second remote operation apparatus 20 and the working machine 40 may indirectly intercommunicate via a remote operation server 30 shown in FIG. 7.

The remote operation server 30 comprises a first server arithmetic processing element 31 and a second server arithmetic processing element 32. The first server arithmetic processing element 31 receives, from the first remote operation apparatus 10, sight line detection data corresponding to a sight line of an operator which is detected in the first remote operation apparatus 10. The second server arithmetic processing element 32 transmits the sight line detection data to the second remote operation apparatus 20, and thereby, displays, in the second image output device 221, a designated image region, in a form different from a form of an image region around the designated image region (see FIG. 6A to FIG. 6D).

REFERENCE SIGNS LIST

10 first remote operation apparatus
20 second remote operation apparatus
30 remote operation server
31 first server arithmetic processing element
32 second server arithmetic processing element
40 working machine
100 first client control device
110 first input interface
111 first operation mechanism
112 sight line detector
120 first output interface
121 first image output device
122 first wireless communication equipment
200 second client control device
210 second input interface
211 second operation mechanism
220 second output interface
221 second image output device
222 second wireless communication equipment
401 imaging device
402 wireless communication equipment
440 working attachment (an actuation mechanism)

The invention claimed is:

1. A remote operation system comprising:

a working machine including an actuation mechanism and an imaging device which images environment including at least a part of the actuation mechanism; and a first remote operation apparatus and a second remote operation apparatus each including wireless communication equipment, an image output device which displays an environmental image corresponding to captured image data acquired by the imaging device of the working machine and an operation mechanism configured to perform a remote operation of the working machine, wherein the first remote operation apparatus comprises a sight line detector which detects a sight line of an operator, and a first client control device which transmits, to the wireless communication equipment, sight line detection data corresponding to the sight line of the operator which is detected by the sight line detector, and the second remote operation apparatus comprises a second client control device which displays, in the image output device, a designated image region as an image region spreading with reference to the sight line of the operator corresponding to the sight line detection data received by the wireless communication equipment in the environmental image, in a form different from a form of an image region around the designated image region.

2. A remote operation server having an intercommunicating function with a working machine including an actuation mechanism and an imaging device which images environment including at least a part of the actuation mechanism, and with each of a first remote operation apparatus and a second remote operation apparatus each including an image output device which displays an environmental image corresponding to captured image data acquired by the imaging device of the working machine by use of a wireless communicating function and an operation mechanism configured to perform a remote operation of the working machine, the remote operation server comprising:

a first server arithmetic processing element which receives, from the first remote operation apparatus, sight line detection data corresponding to a sight line of an operator which is detected in the first remote operation apparatus; and a second server arithmetic processing element which transmits the sight line detection data to the second remote operation apparatus, and displays, in the image output device of the second remote operation apparatus, a designated image region as an image region spreading with reference to the sight line of the operator corresponding to the sight line detection data in the environmental image, in a form different from a form of an image region around the designated image region.

* * * * *